Figure 1:
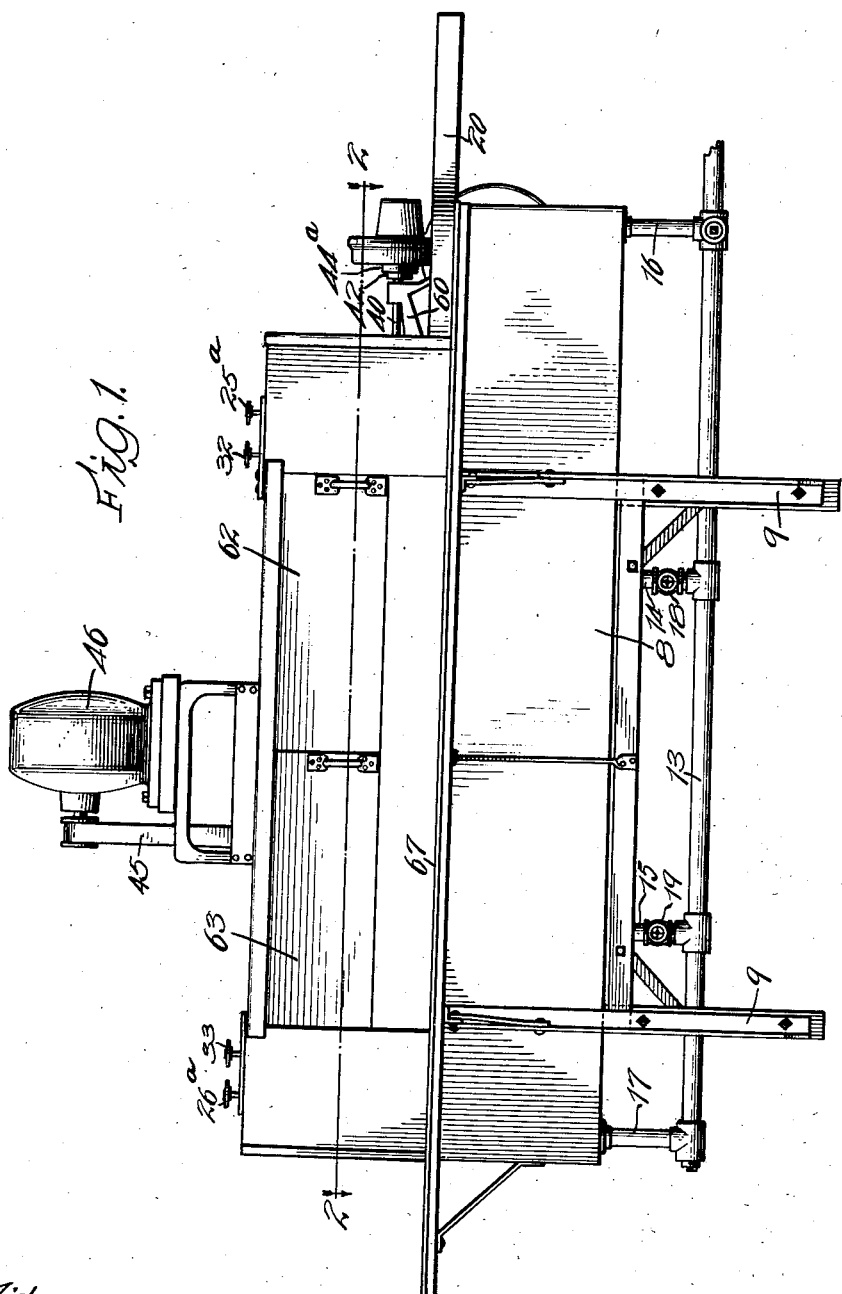

G. S. BLAKESLEE.
DISH WASHING MACHINE.
APPLICATION FILED APR. 14, 1913.

1,202,155.

Patented Oct. 24, 1916.
5 SHEETS—SHEET 1.

Witnesses:

Inventor:
George S. Blakeslee,

G. S. BLAKESLEE.
DISH WASHING MACHINE.
APPLICATION FILED APR. 14, 1913.

1,202,155.

Patented Oct. 24, 1916.
5 SHEETS—SHEET 4.

Witnesses:

Inventor:
George S. Blakeslee,
by Adams & Jackson,
attys.

G. S. BLAKESLEE.
DISH WASHING MACHINE.
APPLICATION FILED APR. 14, 1913.

1,202,155.

Patented Oct. 24, 1916.
5 SHEETS—SHEET 5.

Witnesses:

Inventor:
George S. Blakeslee,
by Adams Jameson
Attys.

UNITED STATES PATENT OFFICE.

GEORGE S. BLAKESLEE, OF CHICAGO, ILLINOIS.

DISH-WASHING MACHINE.

1,202,155.  Specification of Letters Patent.  Patented Oct. 24, 1916.

Application filed April 14, 1913. Serial No. 760,974.

*To all whom it may concern:*

Be it known that I, GEORGE S. BLAKESLEE, a citizen of the United States, residing at Chicago, in the county of Cook, State of Illinois, have invented certain new and useful Improvements in Dish-Washing Machines, of which the following is a specification, reference being had to the accompanying drawings.

My invention relates to dish washing machines of the general type in which the dishes to be washed contained in a suitable basket or container are moved horizontally past one or more paddle wheels which rotate over a receptacle containing water and are arranged to take up the water and deliver it through lateral openings upon the dishes.

The object of my present invention is to provide certain improvements in dish washing machines of the type mentioned, such improvements relating more particularly to the driving mechanism for operating the paddle wheels; to the driving mechanism for operating the conveyer by which the dish-holding baskets are moved through the machine; to the construction of the tank and the arrangement of the paddle wheels with relation thereto; to devices for supporting the baskets after the dishes have been removed from them and while they are being returned to the inlet end of the machine, and to the general construction of the machine as a whole. I accomplish this object as illustrated in the drawings and as hereinafter described.

What I regard as new is set forth in the claims.

Figure 2:
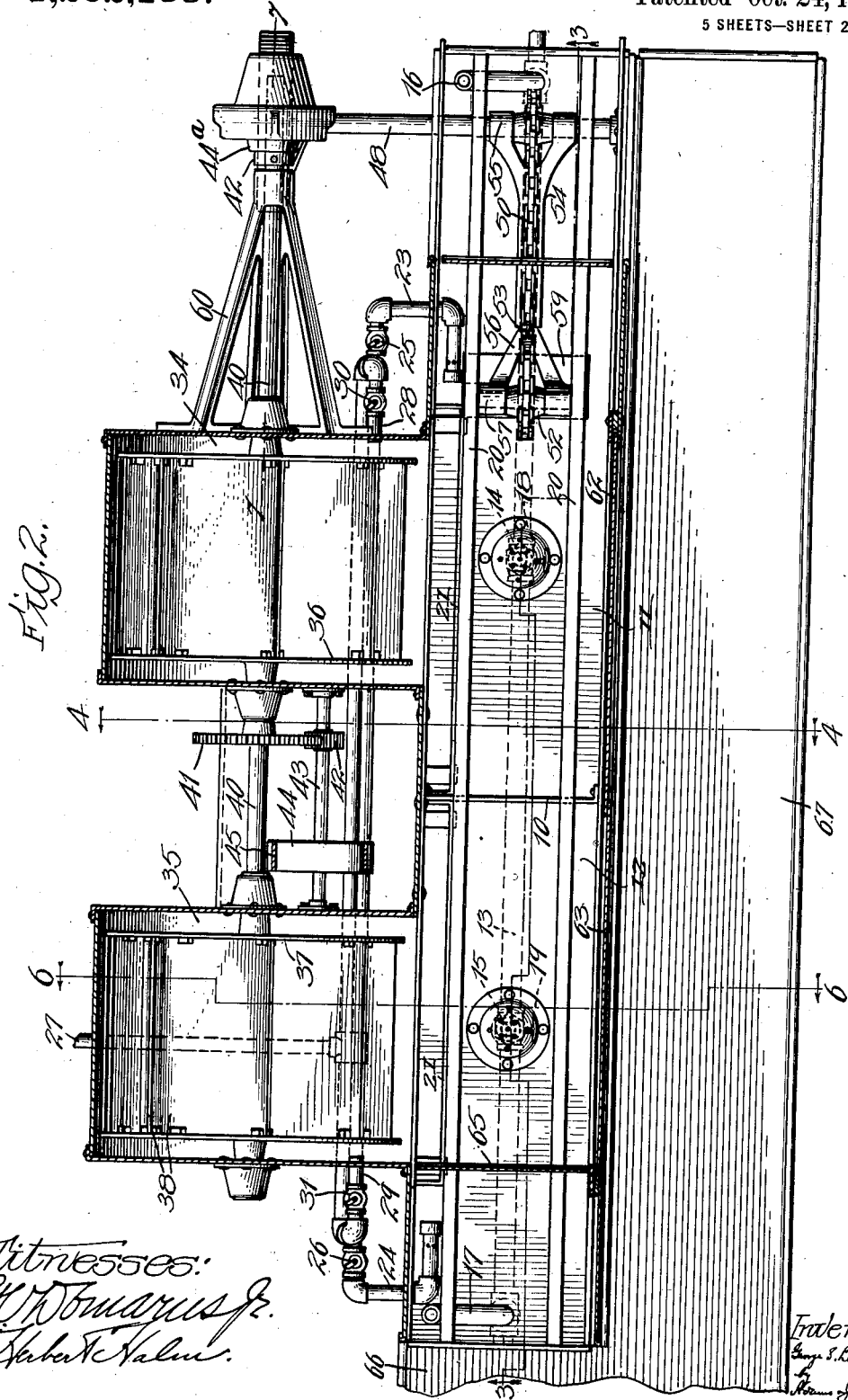
Figure 3:
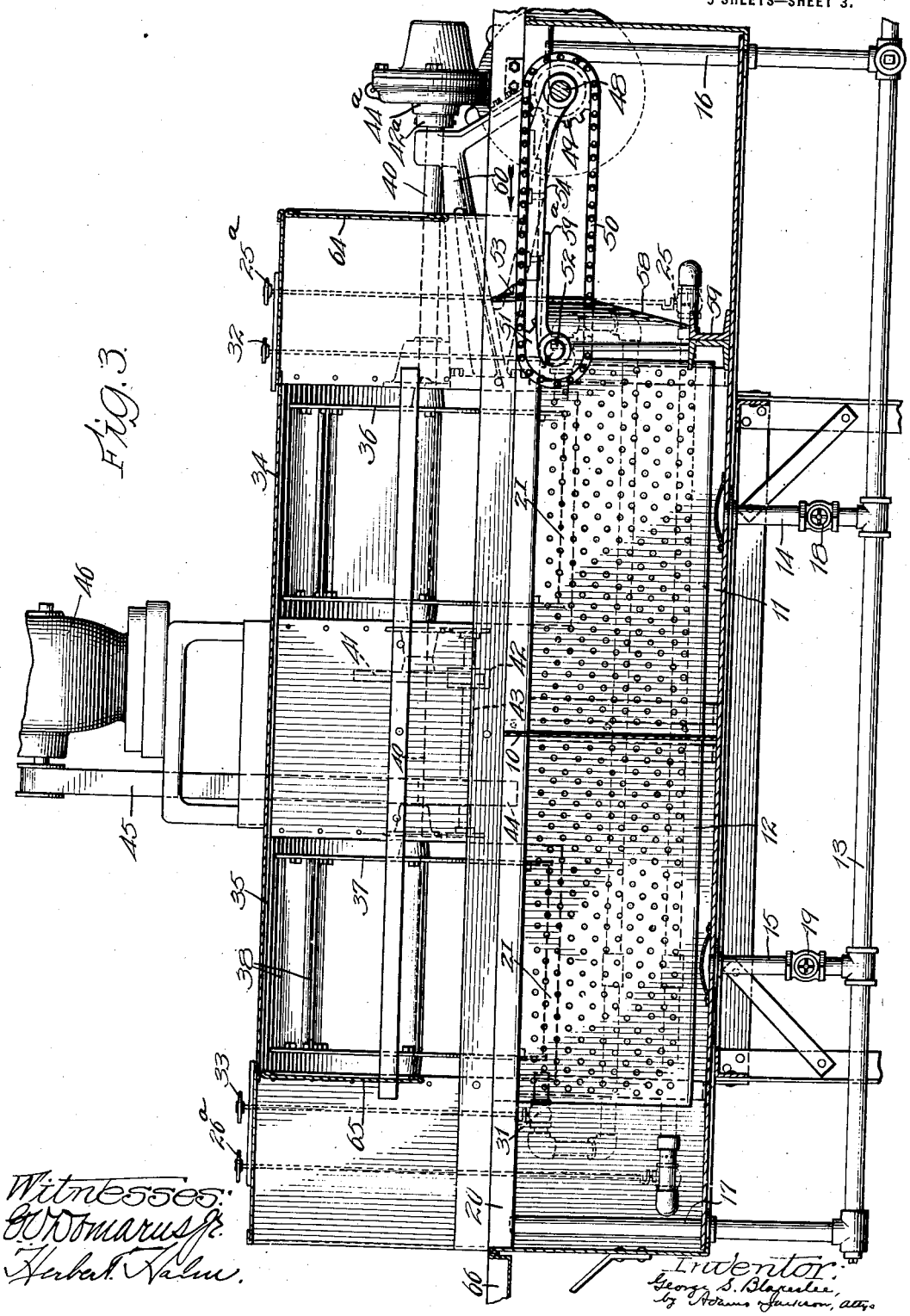
Figure 4:
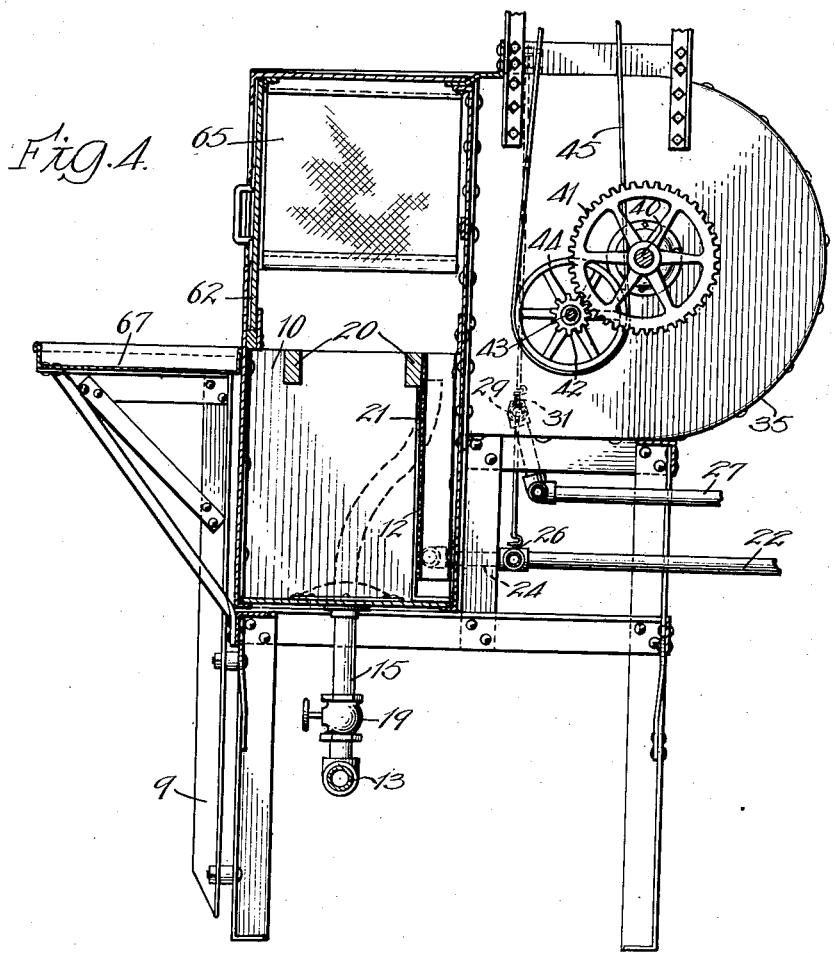
Figure 5:
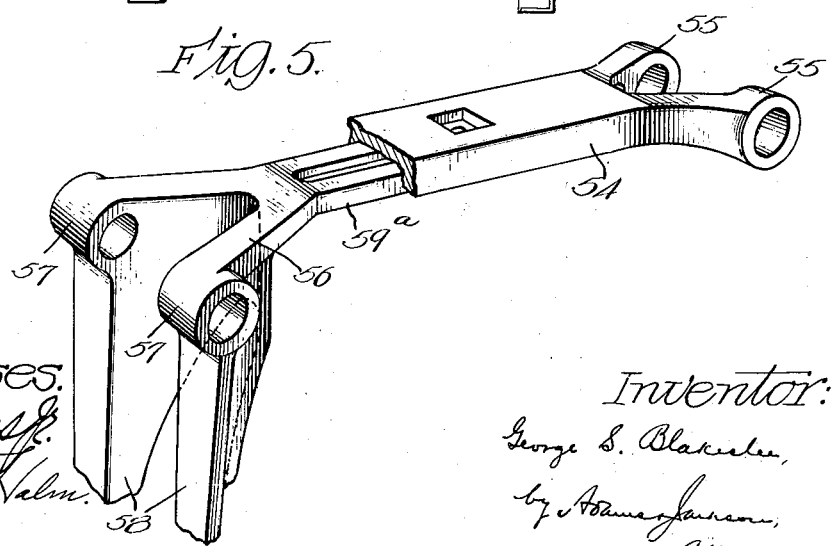
Figure 6:
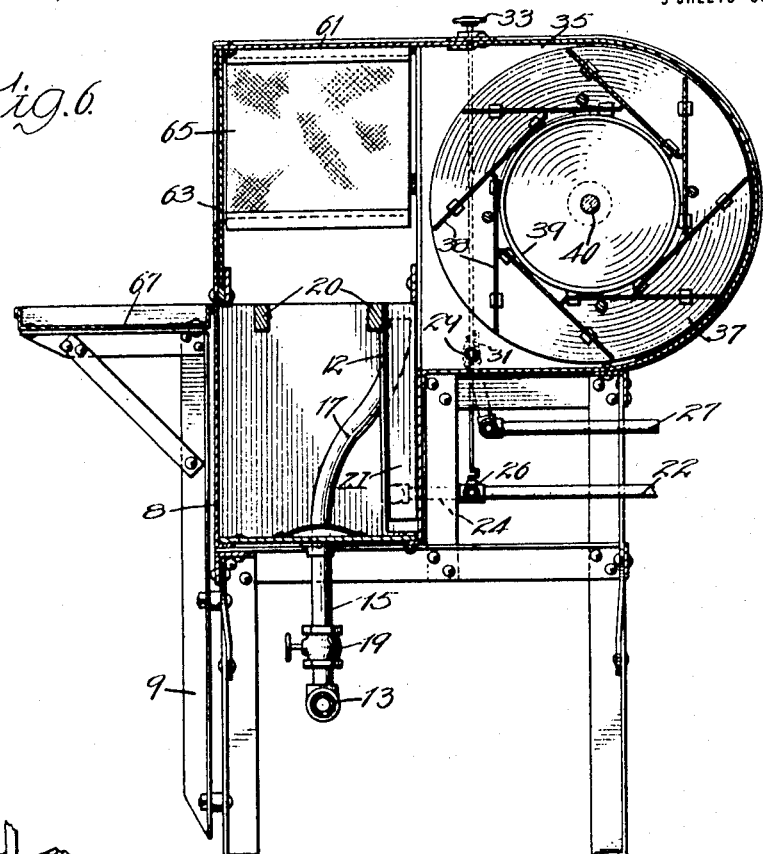
Figure 7:
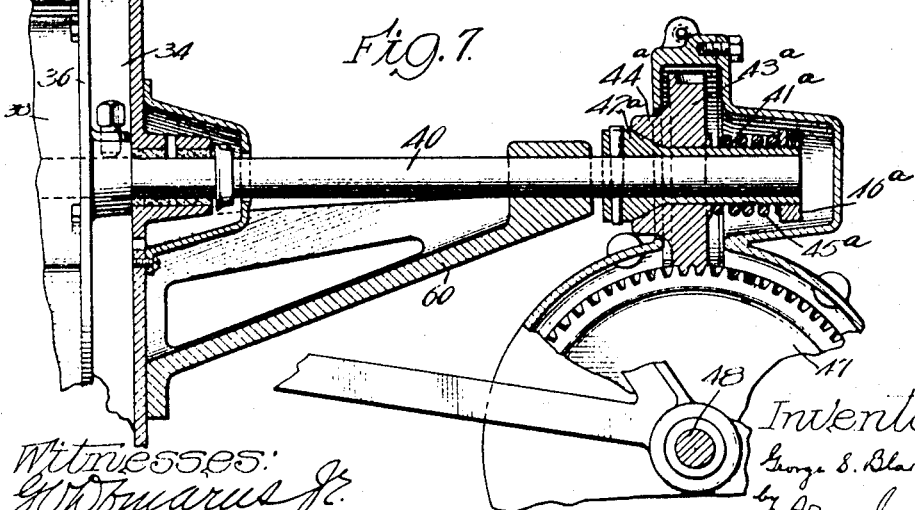

In the accompanying drawings,—Figure 1 is a side elevation of my improved machine; Fig. 2 is a horizontal section substantially on line 2—2 of Fig. 1; Fig. 3 is a vertical section substantially on line 3—3 of Fig. 2; Fig. 4 is a vertical cross-section on line 4—4 of Fig. 2; Fig. 5 is a perspective view of part of the mechanism which supports the conveyer chain by which the baskets are moved into the machine; Fig. 6 is a vertical cross-section on line 6—6 of Fig. 2; and Fig. 7 is an enlarged detail being a longitudinal vertical section substantially on line 7—7 of Fig. 2.

Generally speaking, my improved dish washing machine comprises an elongated tank open at the top and of considerable depth, adapted to contain the washing and rinsing water in separate compartments. Said tank is provided at the top with longitudinally-extending rails or supports for the baskets containing the dishes, so that the baskets may be moved horizontally over the tank from one end to the other, during the washing and rinsing operations. At one side of the tank and at a considerable distance from the bottom thereof are two paddle-wheel compartments set a distance apart and open at the sides next to the tank, the bottoms of said paddle-wheel compartments extending a short distance below the normal level of the water in the tank, so that as the paddle wheels are rotated, they take up the water from the upper portions of the tank compartments and deliver it upon the dishes as they pass. A vertical screen extends longitudinally of the tank near the side at which the paddle-wheel compartments are placed, which screen extends from above the water level down to near the bottom of the tank. In the operation of washing, the heavier particles washed from the dishes settle to the bottom of the tank, and this screen serves to strain the upper portion of the water passing back to the paddle-wheel compartments, so that the water taken up by the paddle wheels is kept cleaner and the necessity of changing it often, is avoided. At the outlet end of the machine there is a tray or table which receives the baskets after they pass through the machine and said table also extends longitudinally of the machine at the side opposite the paddle wheels back to the inlet end of the machine, so that the baskets, after the cleaned dishes have been removed from them, may be moved along on said longitudinally-extending table, back to the starting point.

The dish-holding baskets are moved into the machine by means of an endless belt or chain, driven from the same source of power that drives the paddle wheels, by suitable gearing, comprising a friction clutch which may yield, in case of necessity, to avoid damaging the baskets. The paddle wheels are mounted on a shaft, which is driven by a suitable motor connected with said shaft intermediate of its length and between the two paddle wheels, so that the strain is distributed more equally. Suitable steam and water pipes are provided for supplying steam and water to the tank, and drain and overflow pipes are provided to maintain the water in the tank at the proper level, and for withdrawing it, when desired.

Referring now to the drawings for a more detailed description of the embodiment of my invention therein illustrated, 8 indicates the washing tank, which is in the form of an elongated rectangular box open at the top and mounted on suitable standards or legs 9, as shown in Fig. 1. The tank is preferably made of galvanized sheet iron, and is divided by a transverse partition 10, into a washing compartment 11, and a rinsing compartment 12, as shown in Fig. 3.

13 indicates a drain pipe, having branches 14—15 leading to the bottoms of the washing and rinsing compartments, respectively, and connected with overflow pipes 16—17 arranged at the end portions of the tank, as shown in Fig. 3. The pipes 14—15 are provided with valves 18—19.

20 indicates rails or supports which extend longitudinally of the tank 8, at or near the upper margin thereof, for supporting the dish-holding baskets as they are moved along over the washing and rinsing compartments.

21 indicates a vertical screen arranged near the inner side of the tank 8 and extending longitudinally thereof, said screen extending from the upper portion of the washing and rinsing compartments to near the bottoms thereof, as shown in Fig. 4. As hereinbefore suggested, said screen serves to strain the washing and rinsing water to remove from the water passing into the paddle-wheel compartments the solid impurities suspended therein.

22 indicates a hot water pipe, having extensions 23—24, which lead to the washing and rinsing compartments, respectively, as shown in Figs. 2 and 4. Said extensions are provided with valves 25—26, respectively, which are operated by means of handles 25ª—26ª, at the top of the machine, suitably connected with said valves, as shown in Fig. 3.

27 indicates a steam pipe, having branches 28—29, which lead to the paddle-wheel compartments hereinafter described, for supplying steam to the water therein, to keep it hot. Said extensions are also provided with valves 30—31, controlled from handles 32—33, at the top of the tank and suitably connected with said valves, as shown in Fig. 3.

34—35 indicate paddle-wheel compartments arranged at one side of the washing and rinsing compartments, as shown in Fig. 2; said paddle-wheel compartments being open at their inner sides so as to communicate freely with the washing and rinsing compartments of the tank. As shown in Fig. 6, it will be noted that the bottoms of the paddle-wheel compartments are at a considerable distance above the bottom of the tank 8, so that the water passing into the paddle-wheel compartments is taken from the upper portions of the tank compartments, where it is purer, and as such water is strained by the screen or strainer 21, it is comparatively clean,—even that taken from the washing compartment. The water taken from the rinsing compartment is, of course, much cleaner than that taken from the washing compartment. By this construction it is practicable to continue the washing operation much longer without changing the wash water, than it would be otherwise.

36—37 indicate paddle-wheels arranged respectively in the paddle-wheel compartments 34—35. Said paddle-wheels are preferably of the construction shown in Fig. 6, each having a plurality of blades 38 tangentially disposed with reference to the hub 39 of the paddle-wheel, so that they act to take up the washing and rinsing water and discharge it upon the dishes. Said paddle-wheels are mounted upon a common shaft 40, which extends longitudinally of the machine, parallel with the tank 8, passing through the paddle-wheel compartments, as shown in Fig. 2. Said shaft is driven by means of a gear 41 mounted upon it between the two paddle-wheel compartments, as shown in Fig. 2, which gear meshes with a pinion 42, mounted on a counter-shaft 43, which carries a pulley 44, driven by a belt 45, from an electric motor 46, as best shown in Figs. 2, 3 and 4. By arranging the drive pulleys and gears intermediately upon the shaft 40, as shown and described, the strain upon the shaft 40 and its bearings is distributed more equally, and much less power is required to drive the paddle-wheels. As best shown in Figs. 2 and 3, one end of the shaft 40 is extended beyond the adjacent paddle-wheel compartment, and carries a sleeve 41ª, having a conical portion 42ª, as shown in Fig. 7, said sleeve being keyed to the shaft 40, so that it rotates therewith. The conical portion 42ª of the sleeve forms one member of a friction clutch through which the basket-feeding mechanism is operated, as hereinafter described.

43ª indicates a spiral pinion, which is loosely mounted on the sleeve 41ª, and is provided with a hub 44ª, adapted to fit the conical portion 42ª, of the sleeve 41ª, and form the other clutch member, the arrangement being such that when said members are closely in contact the pinion 43ª will be driven by the shaft 40. Said clutch members are normally held in operative engagement by a spring 45ª, mounted on the sleeve 41ª, between the pinion 43ª and a collar 46ª, screwed upon the outer end of the sleeve 41ª, as shown in Fig. 7.

47 indicates a spiral gear, which meshes with the pinion 43ª, and drives the basket-feeding mechanism. Said gear is mounted upon a transverse shaft 48, suitably mounted in the frame of the machine, as shown in Figs. 2 and 3, said shaft carrying a sprocket wheel 49, which supports one end of an endless chain or belt 50, by which the dish-holding baskets are moved into the machine. The opposite end of said chain is mounted on a sprocket wheel 51, which is carried by a shaft 52, as shown in Figs. 2 and 3, said sprocket wheel being arranged so that the chain 50 extends longitudinally of the machine, its upper surface being substantially on a level with the rails or supports 20, upon which the baskets move. The chain 50 is provided with a lug 53, adapted to engage the baskets and move them along as the chain travels. For the purpose of adjusting the tension of the chain 50 so as to keep it taut, the shaft 52 is carried in bearings which are adjustable toward and from the bearings of the shaft 48, the construction by which this is accomplished being best shown in Fig. 5. As therein shown, 54 indicates a bracket, having diverging arms 55, at one end, which form the bearings for the shaft 48, and 56 indicates a bracket having bosses 57, which form the bearings for the shaft 52. The bracket 56 is supported by standards 58, which rest upon a suitable support, such as a cross-bar 59, preferably formed of two channel-bars arranged back-to-back and secured together, although any other suitable support may be employed. The standards 58 are not secured to the support 59, but merely rest thereon, so that they may move slightly longitudinally of the machine. The bracket 56 is provided with a horizontal slotted plate 59ª, which fits against the under surface of the bracket 54, and is adapted to be secured thereto by bolts or screws. By loosening such bolts the brackets 54—56 may be adjusted longitudinally of each other to increase or reduce the tension on the chain 50.

60 indicates a bracket for supporting the outer end of the shaft 40.

61 indicates a housing or casing which extends over the washing tank and incloses the same. Said casing is provided at the front with sliding doors 62—63, through which access may be had to the interior of the machine opposite the paddle-wheel compartments.

64—65 indicate curtains suspended near the inlet and outlet ends of the casing 61 and arranged transversely thereof to prevent water from splashing out at the ends of the machine. When the baskets are moved into the machine, the curtains are swung aside.

66 indicates a table or tray at the outlet end of the machine, on a level with the upper surface of the tank 8, for receiving the baskets as they pass out of the machine.

67 indicates a table or tray which extends longitudinally of the machine at the side opposite the paddle-wheel compartments from the outlet to the inlet end thereof, as best shown in Fig. 2, said table being practically a continuation of the table 66; thus the dish-holding baskets, after the dishes have been removed from them, may be shoved along upon the table 67, back to the inlet end of the machine.

The operation of the machine has already been quite fully described and therefore need not be repeated, but it may be well to point out the advantage of providing the friction clutch driving mechanism for the feeding chain 50, which is, that in case the progress of the baskets through the machine should be impeded, the clutch will slip, allowing the baskets to stop, without the necessity of stopping the shaft 40, thereby avoiding the danger of breakage.

I do not herein claim broadly a dish-washing machine having a washing tank and a paddle-wheel compartment communicating therewith above the bottom thereof, as that forms the subject-matter of my pending application, Serial No. 677,689, filed February 15, 1912.

That which I claim as my invention, and desire to secure by Letters Patent, is,—

1. A dish-washing machine, comprising receptacles for holding washing and rinsing water, compartments disposed laterally with reference to said receptacles and opening laterally thereinto above the level of the bottom thereof, means in said compartments for throwing water against the dishes, and means for preventing refuse matter washed from the dishes from entering said compartments.

2. A dish-washing machine, comprising separate receptacles for holding washing and rinsing water arranged end to end, compartments disposed laterally with reference to said receptacles and communicating therewith above the bottoms thereof, straining devices between said compartments and said washing and rinsing receptacles and means in said compartments for throwing the wash water against the dishes to be washed.

3. A dish-washing machine, comprising a tank divided transversely into a plurality of receptacles, said tank being open at the top, means at the upper portion of said tank for supporting baskets containing the dishes to be washed, compartments disposed laterally with reference to said tank and communicating therewith above the bottom thereof and below the level of the water therein, means in said compartments for throwing the wash water upon the dishes to be washed, and means for straining the water passing from said receptacles to said compartments.

4. A dish-washing machine, comprising a tank open at the top, means at the upper portion of said tank for supporting baskets containing the dishes to be washed, compartments at one side of said tank and communicating therewith, paddle-wheels in said compartments, means for rotating said paddle-wheels, means at the outlet end of said tank for receiving the dish-holding baskets, and a tray extending longitudinally of said tank at one side thereof for supporting the baskets as they are moved back to the inlet end of the tank.

5. A dish-washing machine, comprising a tank, paddle-wheel compartments disposed laterally with reference to said tank and communicating therewith, said paddle-wheel compartments being a distance apart, paddle-wheels in said compartments, a common shaft on which said paddle-wheels are mounted, a motor mounted above said compartments, and connections from said motor to said shaft for rotating said paddle-wheels from said motor.

6. A dish-washing machine, comprising a tank, paddle-wheel compartments disposed laterally with reference to said tank and communicating therewith, said paddle-wheel compartments being a distance apart, paddle-wheels in said compartments, a common shaft on which said paddle-wheels are mounted, a counter-shaft mounted between said compartments, gearing connecting said counter-shaft with said paddle-wheel shaft, and a motor connected with said counter-shaft for rotating the same.

GEORGE S. BLAKESLEE.

Witnesses:
JOHN L. JACKSON,
W. H. DE BUSK.

Copies of this patent may be obtained for five cents each, by addressing the "Commissioner of Patents, Washington, D. C."